W. A. HARVEY.
TRANSMITTED LIGHT DISPLAY APPARATUS.
APPLICATION FILED APR. 14, 1915.

1,199,378.

Patented Sept. 26, 1916.
2 SHEETS—SHEET 1.

Witnesses
A. M. Fogner
J. T. Stanley

Inventor,
William A. Harvey,
By Knight Bros,
Attorneys.

W. A. HARVEY.
TRANSMITTED LIGHT DISPLAY APPARATUS.
APPLICATION FILED APR. 14, 1915.

1,199,378.

Patented Sept. 26, 1916.
2 SHEETS—SHEET 2.

Witnesses

Inventor,
William A. Harvey,
By Knight Bros,
Attorneys.

UNITED STATES PATENT OFFICE.

WILLIAM A. HARVEY, OF SCRANTON, PENNSYLVANIA, ASSIGNOR TO ARTHUR E. MORSE, OF SCRANTON, PENNSYLVANIA.

TRANSMITTED-LIGHT DISPLAY APPARATUS.

1,199,378.      Specification of Letters Patent.      Patented Sept. 26, 1916.

Application filed April 14, 1915. Serial No. 21,290.

*To all whom it may concern:*

Be it known that I, WILLIAM A. HARVEY, a citizen of the United States, residing at Scranton, in the county of Lackawanna and State of Pennsylvania, have invented certain new and useful Improvements in Transmitted-Light Display Apparatus, of which the following is a specification.

This invention relates to an apparatus for displaying pictures on translucent material or outlined objects by transmitted light for advertising or exhibit purposes, and has for its object to provide convenient means for holding the article to be exhibited in position to be observed and in relation to a source of light that will properly display it.

To these ends, the invention consists in providing a picture-holding frame with a transparent front wall and a light chamber in rear thereof, also having a transparent front wall as well as a suitably mounted source of light, and adapted to overlie and be detachably connected to the frame in a manner to firmly press and hold the picture between the two transparent walls; the illuminating chamber being carried by the frame in such manner that the whole apparatus is presented in display position by merely supporting the frame.

The invention will be fully understood upon reference to the accompanying drawings, in which—

Figure 1:
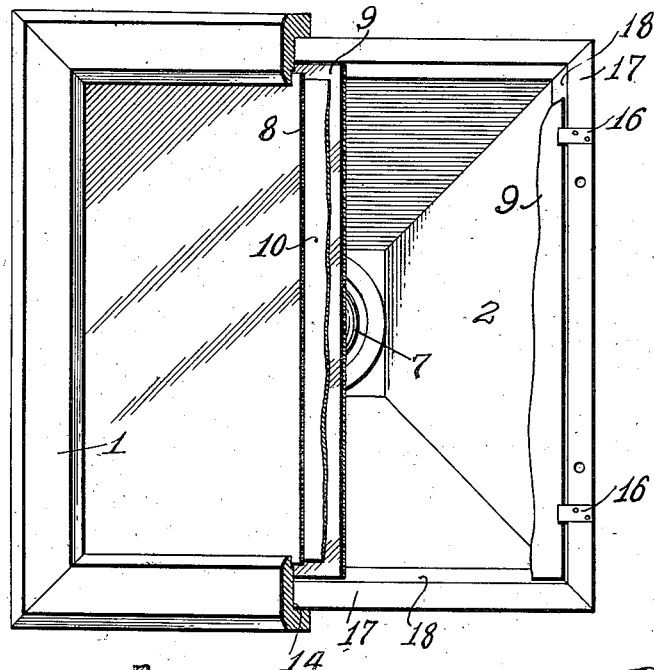
Figure 3:
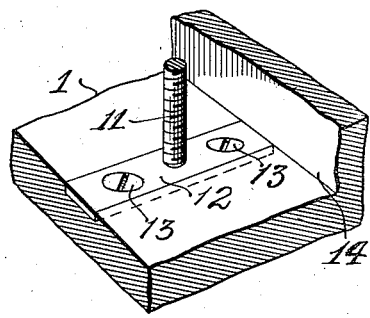
Figure 2:
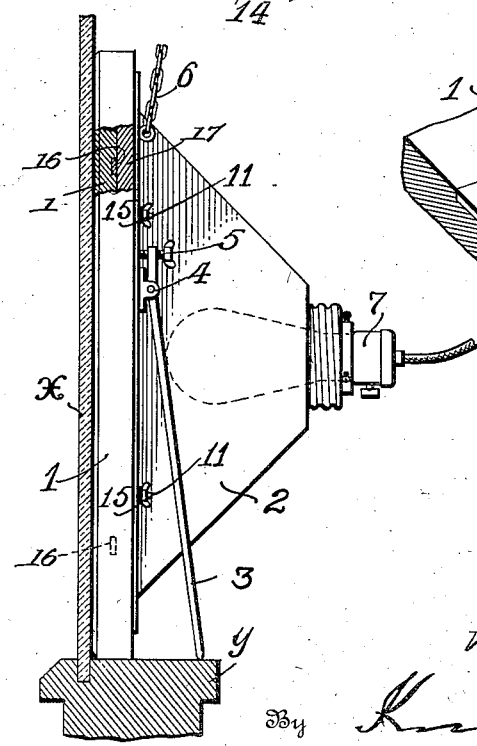
Figure 4:
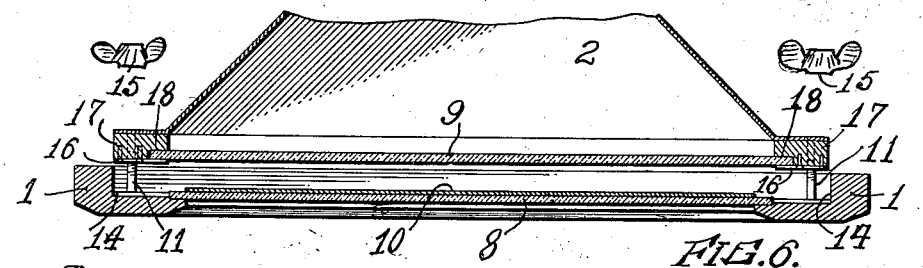
Figures 5, 6:
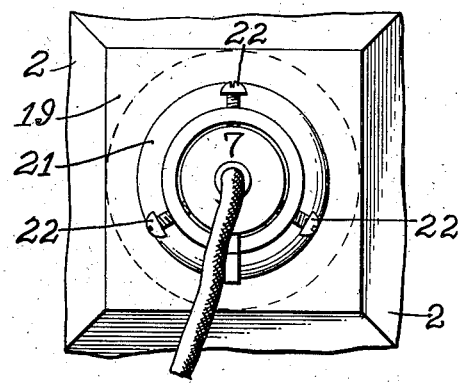
Figures 7, 8:
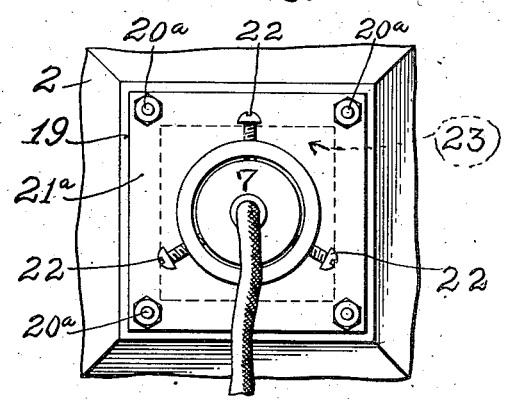

Figure 1 is a front view of the complete apparatus, with parts broken away to disclose the construction; Fig. 2 is a side elevation of the apparatus in position upon the sill within a show window; Fig. 3 is a detail view of a portion of the main frame and one of the studs through which the frame of the light chamber is secured thereto; Fig. 4 is a sectional view of the apparatus with the two main parts separated and a portion of the light chamber omitted; Figs. 5 and 6 are, respectively, a section from front to rear, and a rear elevation of the rear portion of the light chamber, according to one construction, and Figs. 7 and 8 are views similar to Figs. 5 and 6, showing another construction of the rear end of the light chamber.

1 represents the main frame and 2 the light chamber fitted thereto and united therewith so as to be carried thereby. The main frame may be supported in display position after the manner of an easel, by providing it with bracing legs 3 hinged thereto at 4 and having adjusting screws 5 that limit their opening movement and prevent the legs from sliding backward upon the supporting base. But the apparatus may be supported in display position by flexible suspending connections, such as chains 6. The illuminating chamber 2 is in the form of a pyramid, and has at its rear end or apex, an electric lamp 7, which is secured in position by means of a fitting to be hereinafter described, which makes the lamp bodily removable along with its bulb in case it should become necessary to replace the latter, without disassembling the main parts of the display apparatus.

The main frame 1 carries a glass or other transparent front wall 8, while the illuminating chamber 2 is provided with and closed by a glass or other transparent front wall 9 in such relation to the wall 8 as to firmly press and hold the exhibit 10 between them. The illuminating chamber 2 is secured to the frame 1 by means of the studs 11 suitably mounted upon the main frame, as for instance by means of base plates 12 and screws 13, and to hold the illuminating chamber in position, the main frame is provided with a seat 14 which confines the illuminating chamber laterally, while the wing nuts 15 or other securing means are applied to the studs 11 to hold the parts in assembled relation. The transparent wall 9 of the illuminating chamber is held in place by clips 16 upon the frame 17 which forms the base of the pyramidal chamber 2, and said wall 9 is dropped into the seat 18 of the same depth as the thickness of the wall 9; the wall 9 being sufficiently larger than the wall 8 to permit the clips 16 to lie beyond the edges of the wall 8, and said clips 16 being recessed into the frame 1, so that there is nothing to prevent pressure of the wall 9 upon the exhibit 10, and the latter is held in smooth condition. With this construction of the two main parts, it will be seen that it is merely necessary to remove the nuts 15 when the illuminating chamber with one of the transparent clamping walls can be removed bodily to permit changing the exhibit, after which the two main parts are reassembled and screwed up tight when the apparatus is ready for use.

To supply necessary illumination in the chamber 2 and in uniform relation to the area of the transparent walls, the lamp 7 projects inwardly a sufficient distance to develop a considerable lateral radiation against the inclined walls of the pyramidal illuminating chamber, so that the light is reflected abundantly over the entire area of the transparent walls. To render the electric lamp readily removable and replaceable without disturbing the main parts of the apparatus, it is mounted in a removable closure for the rear end of the illuminating chamber, which is of such dimension as to permit the lamp to be removed intact rather than necessitate separation of the illuminating chamber, removal of its front wall, and withdrawal of the lamp bulb in that way. According to the construction shown in Figs. 5 and 6, a neck 20 carried by the rear wall 19 of the illuminating chamber has threaded upon it, a collar 21 which is secured by set screws 22 to the ordinary lamp socket 7, the dimensions of the parts being such as to leave a space 23 ample for withdrawal of the bulb, so that should the lamp burn out, a new bulb can readily be replaced without removing the display apparatus from its display position.

According to the forms shown in Figs. 7 and 8, the rear wall 19 has secured upon it by bolts 20ª, a cover 21ª whose set screws 22 hold the lamp socket 7 in place, as in Figs. 5 and 6; a space 23 being likewise in this instance left, sufficient to withdraw the bulb.

I claim:—

1. In an apparatus for displaying exhibits by transmitted light, the combination of a main frame having a transparent front wall and a depressed seat, a tapered illuminating chamber having a frame at its base adapted to fit in said seat and provided with a recess, a transparent front wall mounted in said recess of the frame of the illuminating chamber in position to close the front of the latter, the thickness of the wall being identical with the depth of said recess and clips therefor on the frame of the illuminating chamber, said clips projecting beyond the external surface of its front wall, recesses being provided in the bottom of said seat for the clips, said front wall of the illuminating chamber being adapted to lie upon an exhibit when laid upon the transparent wall of the main frame, and a source of illumination in the reduced end of the illuminating chamber.

2. An apparatus for displaying exhibits by transmitted light, comprising a main frame formed with a depressed seat, a transparent front wall mounted in said main frame at the bottom of said seat, but with its surface at least as high as the bottom of the seat, an illuminating chamber having a frame fitting in said seat and means including studs in the seat, projecting through said chamber frame for firmly securing it to the main frame; said illuminating chamber frame having its internal dimensions approximately equal to those of the transparent wall of the main frame, a transparent front wall for said illuminating chamber and holding means therefor on the frame of said chamber, said holding means being situated beyond the edges of the transparent wall of the main frame, and a source of illumination in said illuminating chamber.

The foregoing specification signed at Scranton, Pennsylvania, this 24th day of March, 1915.

WILLIAM A. HARVEY.